March 6, 1945.  J. C. WIDMONT  2,370,828
MACHINING AND ASSEMBLING APPARATUS
Filed June 24, 1942   9 Sheets-Sheet 1

Joseph C. Widmont
Inventor
By Hearl Benst
His Attorney

March 6, 1945. J. C. WIDMONT 2,370,828
MACHINING AND ASSEMBLING APPARATUS
Filed June 24, 1942 9 Sheets-Sheet 2
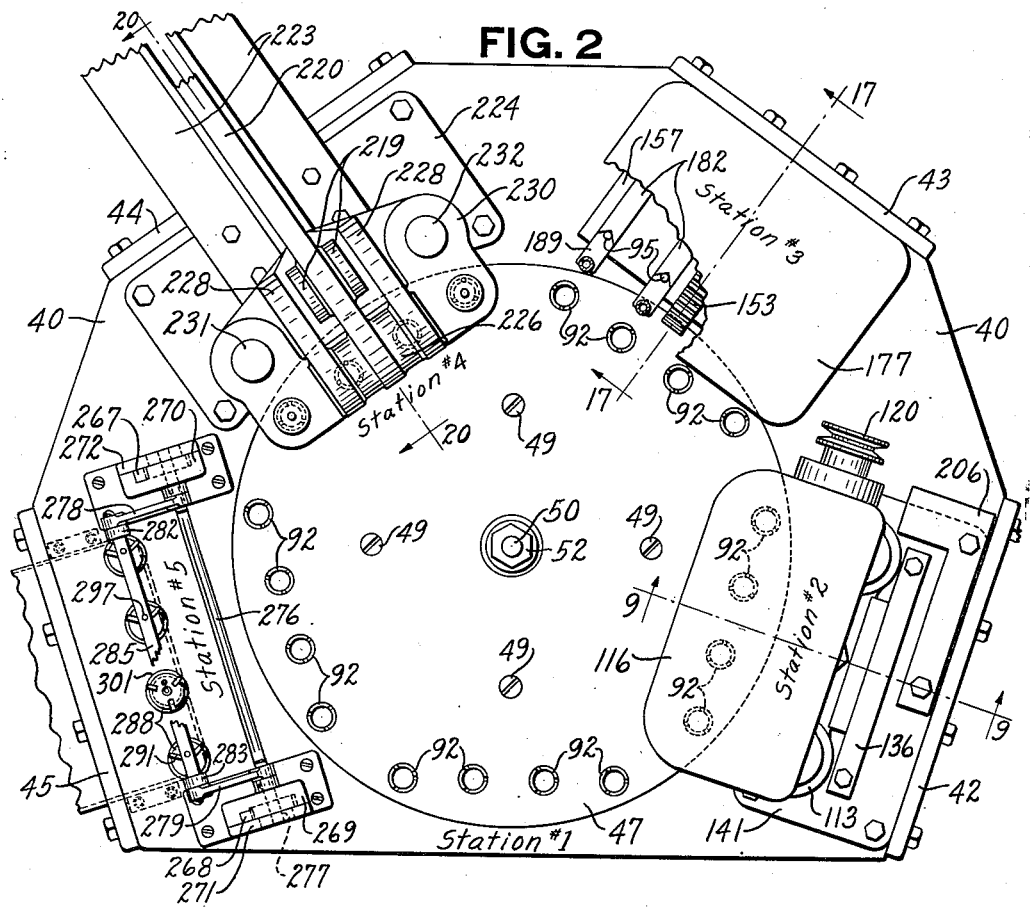
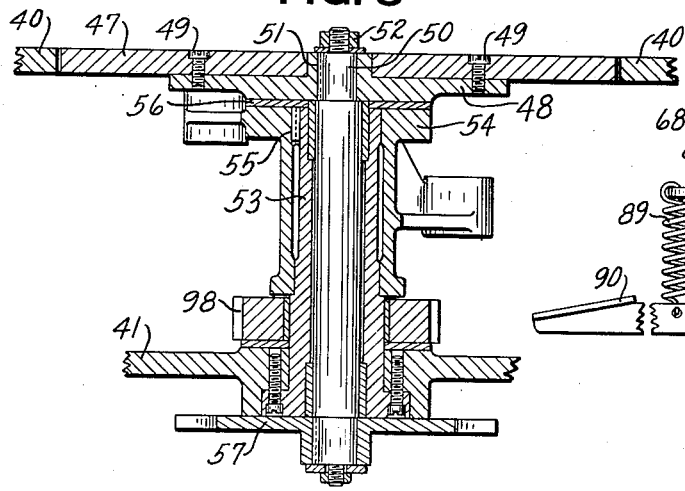
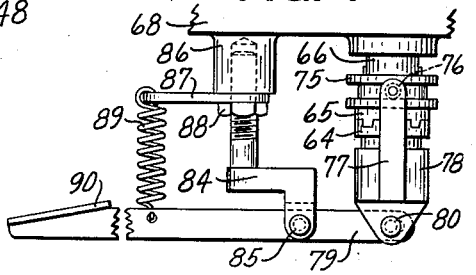
Joseph C. Widmont
Inventor
By *Hearl Benist*
His Attorney March 6, 1945.  J. C. WIDMONT  2,370,828
MACHINING AND ASSEMBLING APPARATUS
Filed June 24, 1942  9 Sheets-Sheet 3
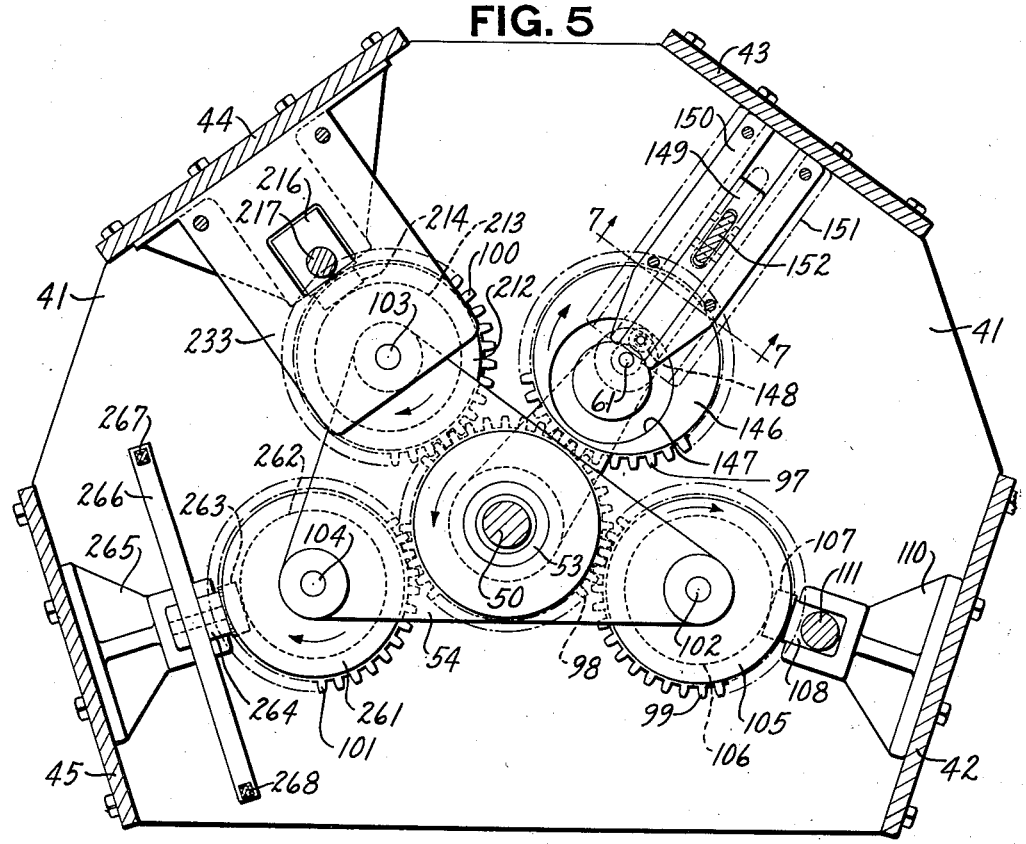
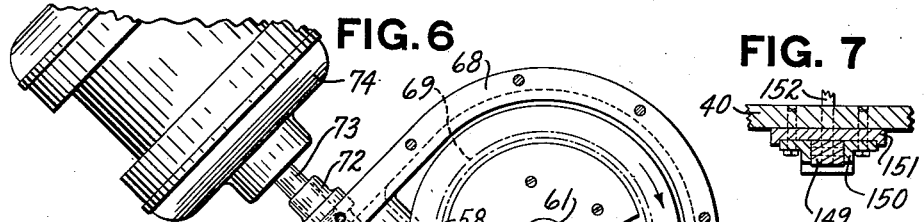
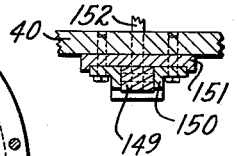
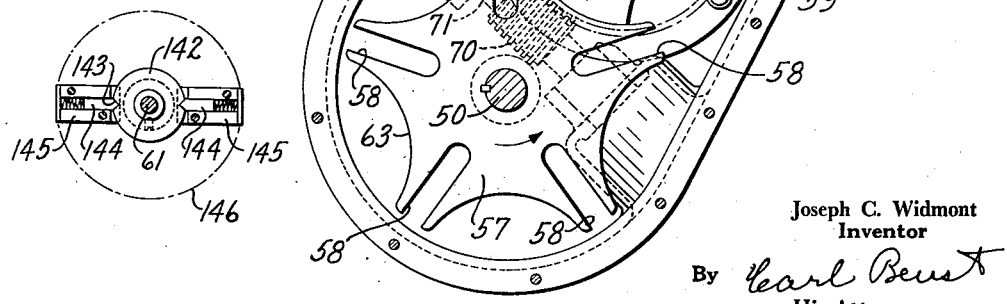
Joseph C. Widmont
Inventor
By *Earl Beust*
His Attorney

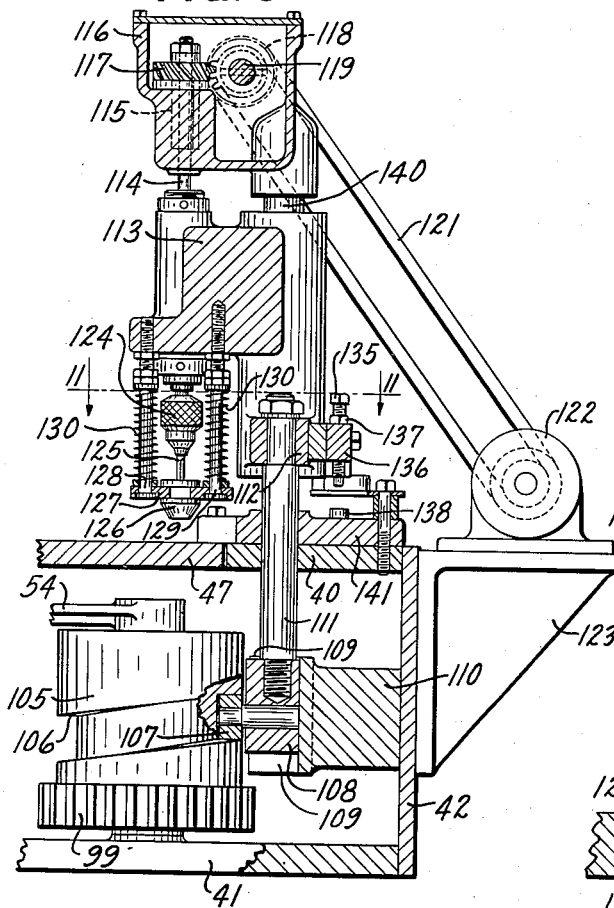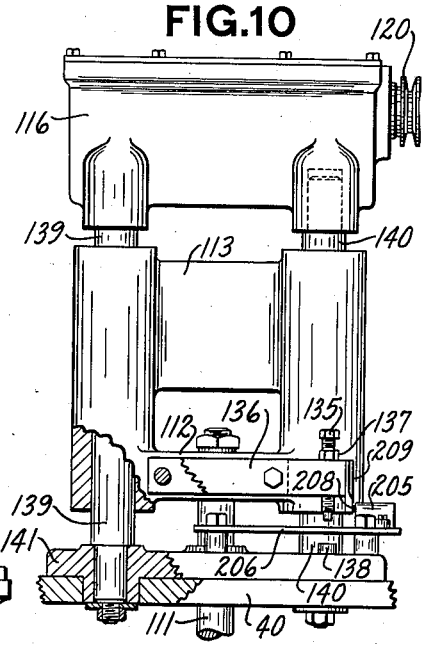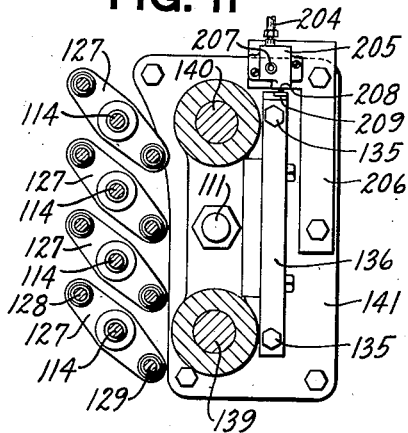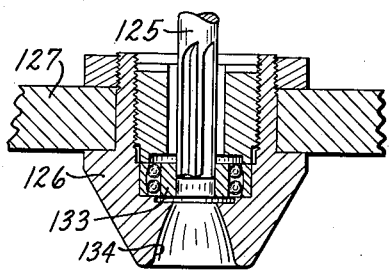

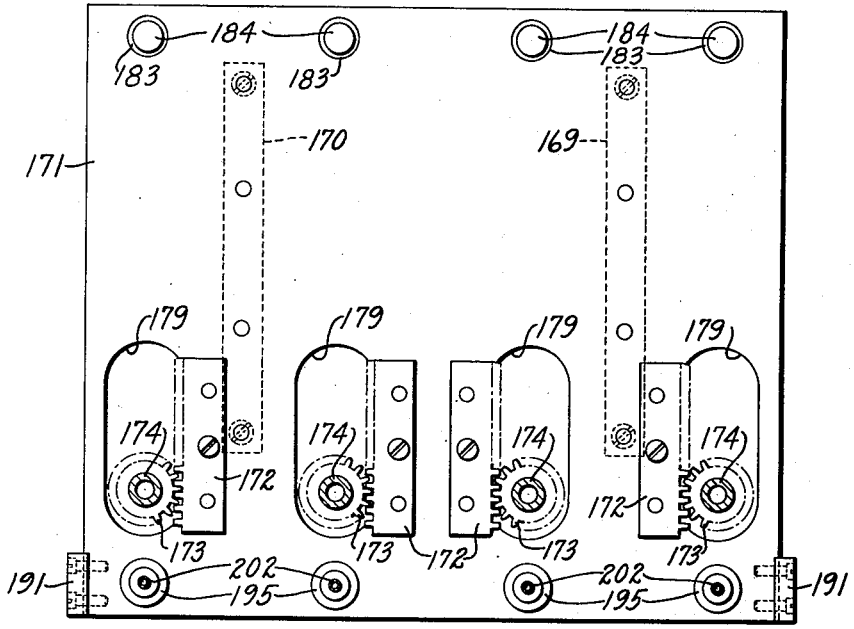
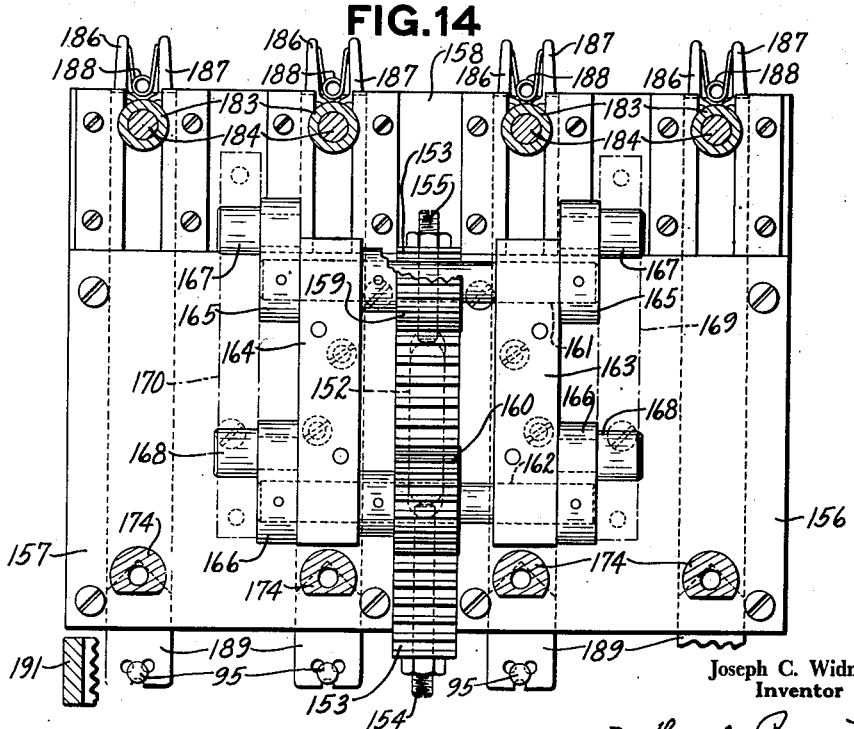

March 6, 1945.　　　J. C. WIDMONT　　　2,370,828
MACHINING AND ASSEMBLING APPARATUS
Filed June 24, 1942　　　9 Sheets-Sheet 6
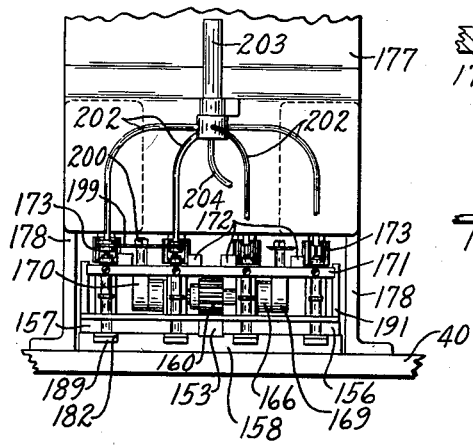
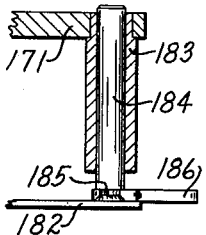
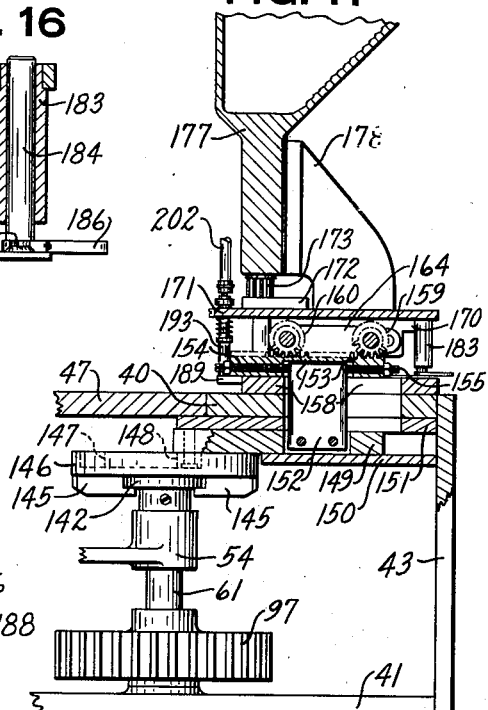
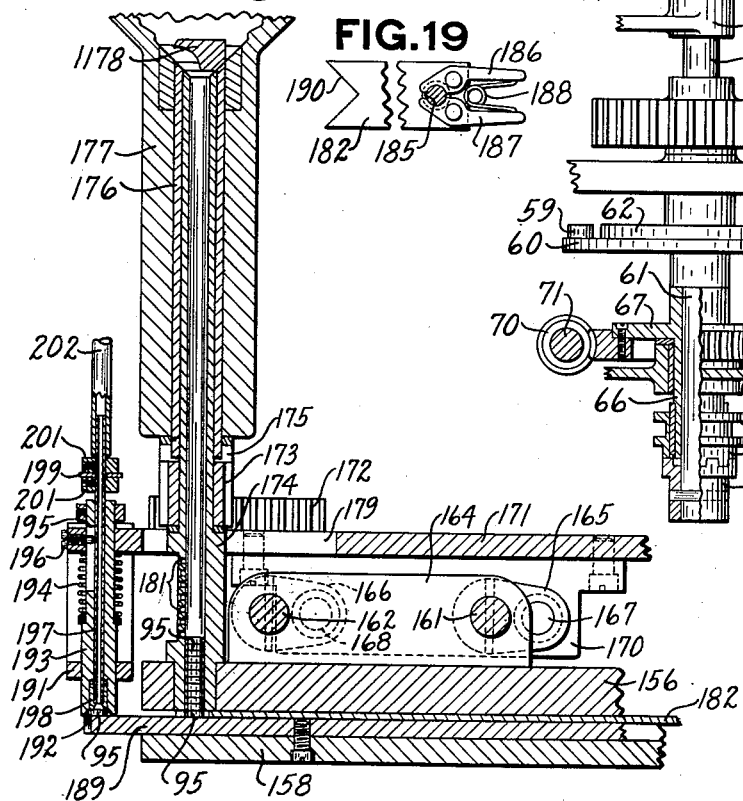
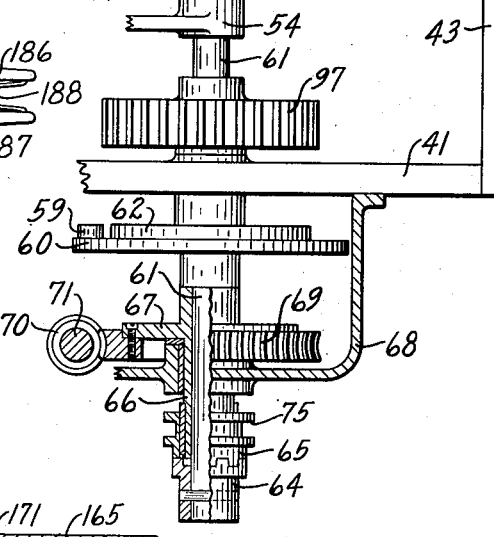
Joseph C. Widmont
Inventor
By *Carl Benet*
His Attorney March 6, 1945. J. C. WIDMONT 2,370,828
MACHINING AND ASSEMBLING APPARATUS
Filed June 24, 1942 9 Sheets-Sheet 7
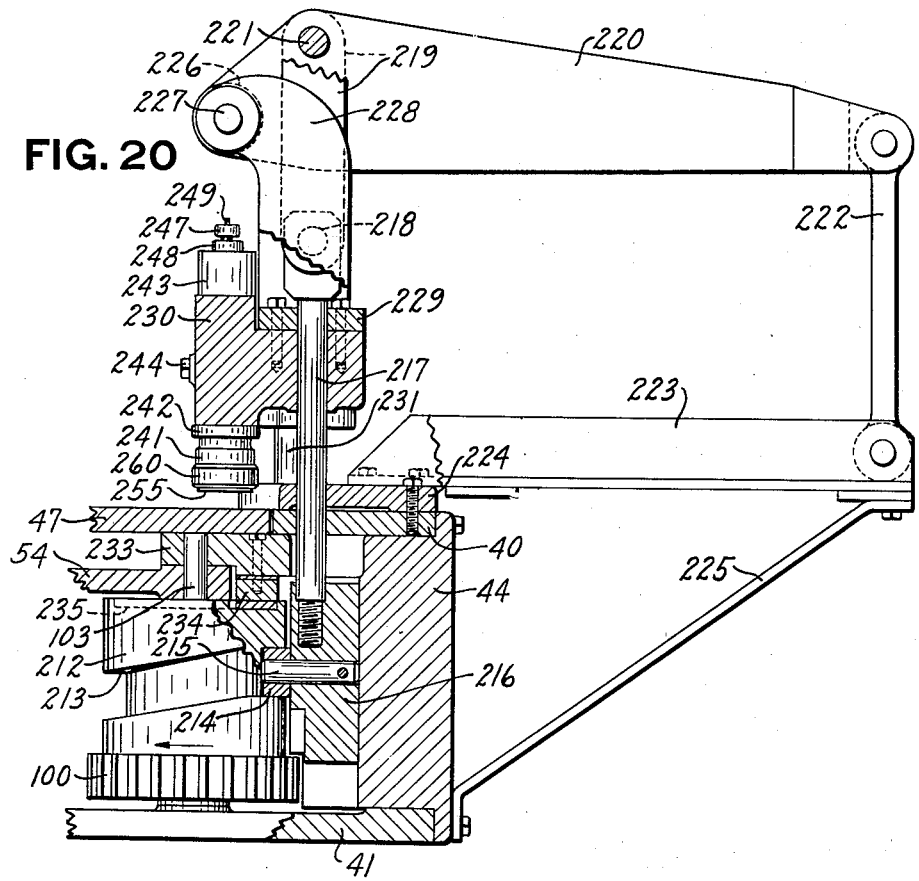
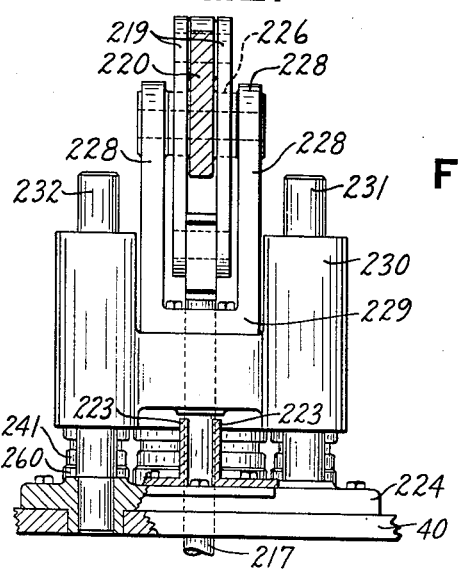
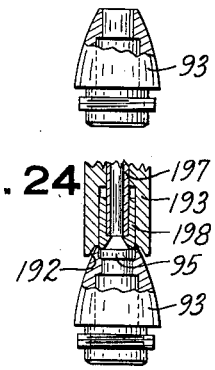
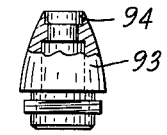
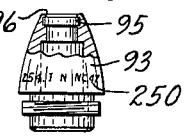
Joseph C. Widmont
Inventor
By Carl Benst
His Attorney March 6, 1945.  J. C. WIDMONT  2,370,828
MACHINING AND ASSEMBLING APPARATUS
Filed June 24, 1942  9 Sheets-Sheet 8

Joseph C. Widmont
Inventor
By Pearl Benst
His Attorney

March 6, 1945.  J. C. WIDMONT  2,370,828
MACHINING AND ASSEMBLING APPARATUS
Filed June 24, 1942  9 Sheets-Sheet 9

Joseph C. Widmont
Inventor
By Earl Beust
His Attorney

Patented Mar. 6, 1945

2,370,828

UNITED STATES PATENT OFFICE 2,370,828

MACHINING AND ASSEMBLING APPARATUS

Joseph C. Widmont, Dayton, Ohio., assignor to The National Cash Register Company, Dayton, Ohio, a corporation of Maryland Application June 24, 1942, Serial No. 448,327

6 Claims. (Cl. 214—1)

The present invention is directed to a special type of machine for performing certain machining and assembling operations upon a plurality of identical parts as said machine advances said parts step by step through a plurality of operating stages.

One object of the present invention is to provide a special type of machine for automatically performing certain machining and assembling operations upon a plurality of identical parts at one time.

Another object of this invention is the provision of a machine for performing certain machining and assembling operations upon a plurality of identical parts in one cycle of operation of said machine, during which said parts are advanced step by step from one stage of the operating cycle to another.

Still another object is to provide a special type of machine for performing certain machining and assembling operations upon a plurality of identical parts at one time during different stages of an operating cycle, and further to provide said machine with means to advance the parts automatically step by step from one stage of the operating cycle to another.

A further object of the present invention is to provide a machine for performing certain machining and assembling operations upon a plurality of identical parts as said machine advances said parts step by step through a plurality of operating stages.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 2 is a plan view of the top plate portion of the machine, showing the turntable for carrying the parts through the different stages of operation and also showing the different operating mechanisms of the machine.

Fig. 3 is a fragmentary cross-sectional view showing in particular the turntable for carrying the parts through the different stages of the operating cycle and the spindle and associated mechanism for rotatably supporting said table.

Fig. 4 is a side elevation of the manually operated clutch mechanism for controlling operation of the machine.

Fig. 5 is a plan view of the bed plate portion of the machine, showing the gearing for driving the different mechanisms of the machine.

Fig. 6 is a plan view of the motor and the Geneva gear mechanism operated thereby, for rotating the turntable step by step through the different stages of the operating cycle.

Fig. 7 is a cross-sectional view taken along line 7—7 of Fig. 5, looking in the direction indicated by the arrows, showing in detail the construction of the slide for operating the pellet feeding and assembling mechanism.

Fig. 8 is a detail view of the yieldable safety clutch mechanism for connecting the pellet advancing and assembling mechanism to the main driving mechanism.

Fig. 9 is a cross-sectional view taken along line 9—9 (Fig. 2), looking in the direction indicated by the arrows, showing in detail the counterboring mechanism.

Fig. 10 is a back elevation of a part of the mechanism shown in Fig. 9.

Fig. 11 is a sectional view taken along line 11—11 (Fig. 9), looking in the direction indicated by the arrows, illustrating details of construction of the counterboring mechanism.

Fig. 12 is an enlarged fragmentary sectional view, showing in particular the locating and guiding bushing for one of the counterboring heads and also showing one of the parts in position to be engaged by said bushing and thereby retained against displacement during the counterboring operation.

Fig. 13 is a plan view of the top plate of the pellet agitating and assembling mechanism.

Fig. 14 is a plan view of the bottom plate of the pellet agitating and assembling mechanism.

Fig. 15 is a front elevation, on a reduced scale, of the pellet assembling mechanism.

Fig. 16 is an enlarged detail view showing the construction of a portion of the pellet feeding mechanism.

Fig. 17 is a cross-sectional view taken along line 17—17 (Fig. 2), looking in the direction indicated by the arrows, showing the pellet assembling mechanism and a portion of the main operating mechanism.

Fig. 18 is a sectional view, on an enlarged scale, of the pellet assembling or transporting mechanism.

Fig. 19 is a fragmentary view of one of the pellet feeding slides.

Fig. 20 is a cross-sectional view taken along line 20—20 (Fig. 2), looking in the direction indicated by the arrows, showing the mechanism for swaging or crimping the assembled pellets in place.

Fig. 21 is a rear elevation of a portion of the mechanism shown in Fig. 20.

Figs. 22, 23, 24, and 25 are detail views of identical parts being processed by the machine of this invention and show the different stages of machining and assembling operations performed on these parts by said machine.

Figure 26:
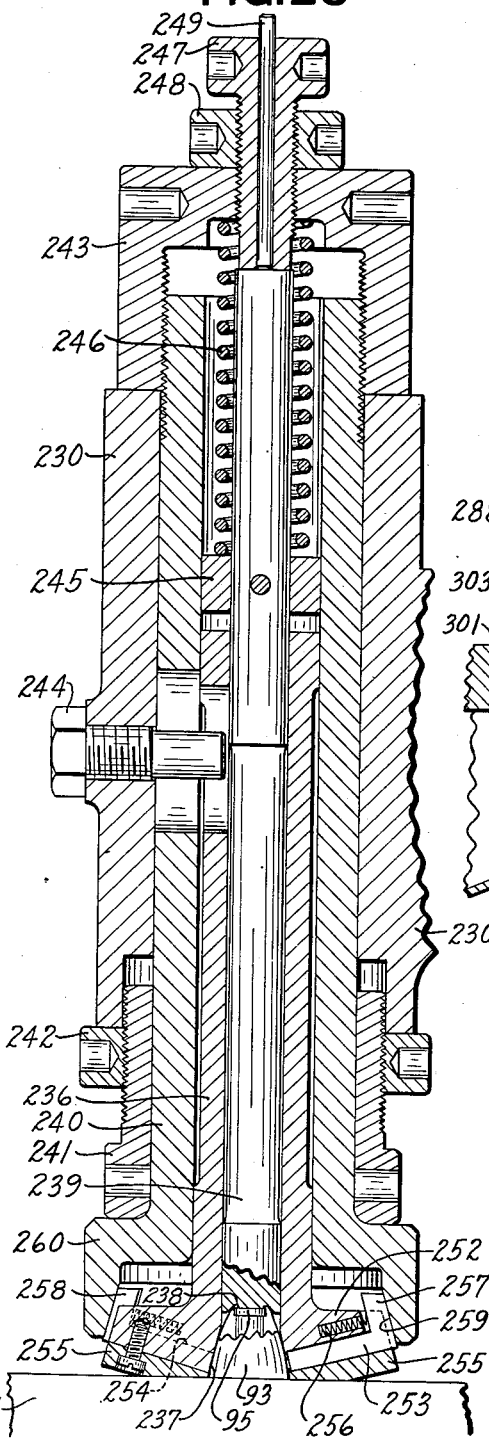

Fig. 26 is a sectional view, on an enlarged scale, showing in detail the construction of one of the crimping spindles and the associated mechanism for stamping identifying data on the parts being processed.

Figure 27:
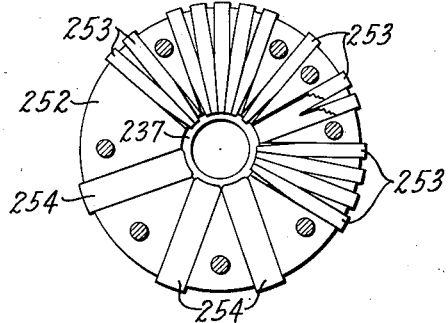

Fig. 27 is an end view of the spindle shown in Fig. 26, showing in detail the stamping mechanism.

Figure 28:
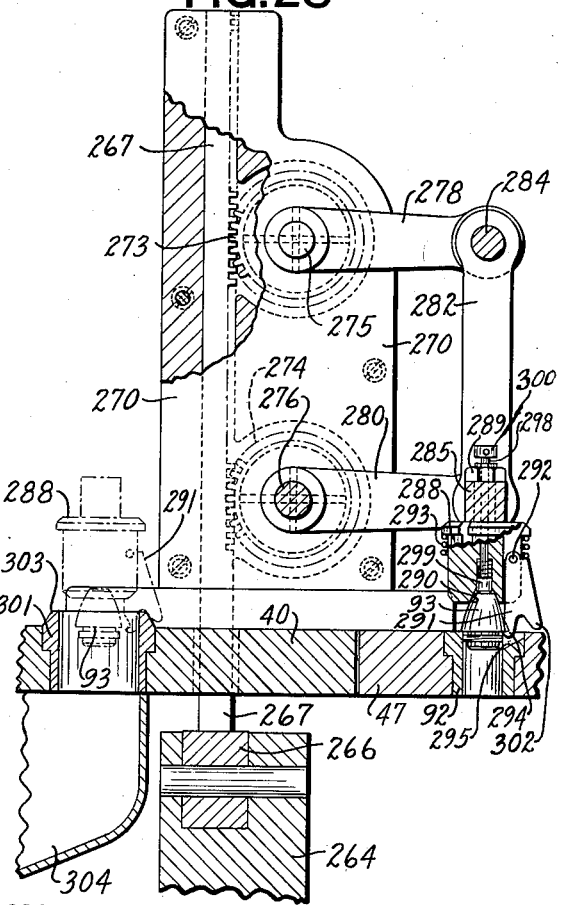

Fig. 28 is a partially sectioned view showing the mechanism for ejecting the finished parts from the machine at the position which it occupies at the termination of its initial or take-up movement.

Figure 29:
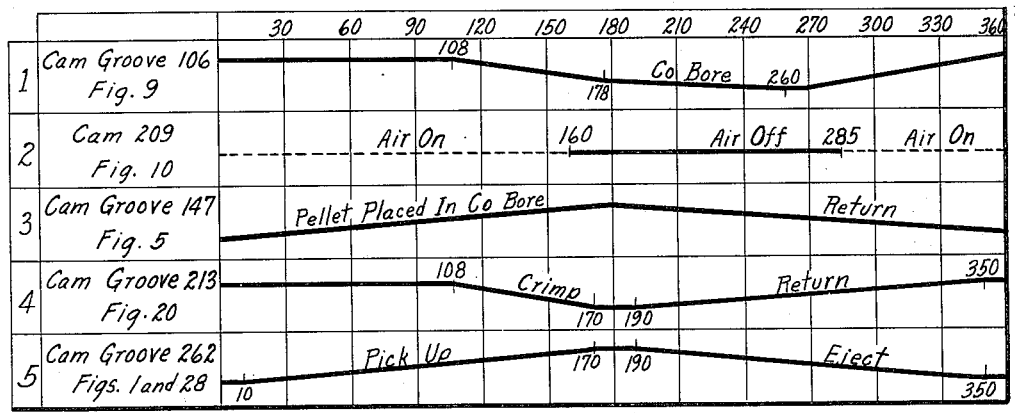

Fig. 29 is a time chart giving the timing of the different mechanisms of the machine of this invention.

GENERAL DESCRIPTION

The subject of this invention is a special type of semi-automatic machine for forming a counterboring in one end of a small machined part (in this particular case the nose or fuse portion of a projectile), placing a pellet or disk of metal in the counterboring thus formed, swaging or crimping over the end of the fuse to retain the pellet in the counterboring, and finally ejecting the processed fuse.

As presently constructed, the machine has an operating cycle comprising five steps or stages and is arranged to process four identical parts at one time in each stage of the operating cycle.

In the first stage of operation, the fuses are hand-loaded into suitable nesting recesses located in a turntable which carries said fuses through the different stages of operation, and in the second stage of operation the machining of the counterborings takes place. In the third stage of the operating cycle, pellets are fed from a hopper or magazine, where they are stored, and placed in the counterborings, and in the fourth stage of operation the upper ends of the fuses are crimped over adjacent to the counterborings to secure the pellets in place therein. Also during the fourth stage of the operating cycle, and occurring simultaneously with the crimping of the fuses, identifying data is stamped on the outer circumference of said fuses near the base thereof. In the fifth stage of the operating cycle, the completed fuses are picked out of the recesses in the turntable and deposited in a chute which conveys them to a suitable container.

The turntable which carries the fuses through the different stages of operation has five sets of recesses, corresponding to the five stages of operation, and each set comprises four recesses. Thus it is seen that four of the parts may be processed during each stage of operation. However, the number of parts processed at each stage is not of material importance, as this number may readily be increased or decreased to met the particular requirements of production.

The only part of the operating cycle which is not automatic is the hand loading of the parts to be processed into the recesses in the turntable during the first stage of the operating cycle. Undoubtedly the machine could have been arranged to automatically load the parts to be processed into the recesses in the turntable; however, this was believed to be unnecessary because, to insure proper operation of the machine, the constant presence of an attendant is necessary, and it is likewise of vital importance that the parts be properly placed in the recesses of the turntable in order to insure the necessary accuracy in the processing of said parts.

The turntable is connected to a main driving motor by a Geneva gear device, which device intermittently rotates said turntable, and the parts to be processed by the machine, through the five stages of an operating cycle, in proper timing. Cams, driven by the main operating motor, control the timing and the operation of the counterboring, the pellet assembling, the crimping and stamping, and the ejecting mechanisms.

In the ensuing pages, a detailed description will be given of the machine of this invention, said description including repeated reference to the different figures of the drawings, in which like reference numerals refer to like parts.

DETAILED DESCRIPTION

Framework and turntable

Figure 1:
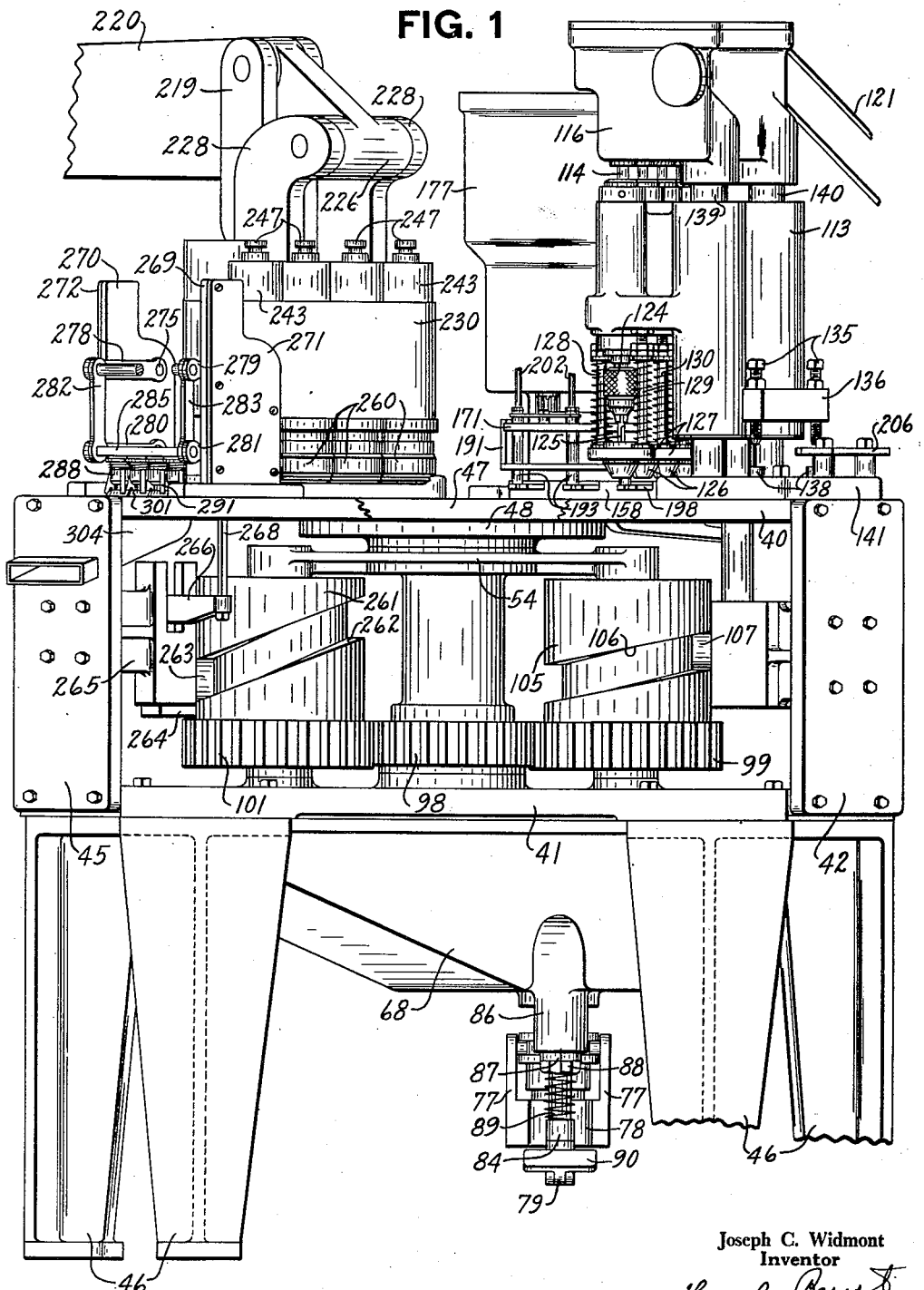
Fig. 1 is a front elevation of the complete machine.

Directing attention to Figs. 1, 2, and 5, the framework of the machine of this invention comprises a top plate 40 and a bed or base plate 41, said plates being secured in parallel relationship to each other by uprights 42 to 45, inclusive, secured respectively to the outer edges of said plates 40 and 41. The machine is supported on a suitable foundation by four similar legs 46 (Fig. 1) secured to the bottom of the base plate 41. The top plate 40 (Figs. 1 and 2) has therein a circular opening, through which extends a turntable 47, the top surface of which is flush with the top surface of the plate 40.

The turntable 47 (Figs. 1, 2, and 3) has in the center thereof a boring, which fits over a tenon on a flange 48, said flange being secured to said table by a plurality of screws 49. A boring in the center of the flange 48 fits over a tenon (Fig. 3) on the upper end of a spindle 50. A key 51 secures the flange 48 and the spindle 50 in fixed relationship to each other. The flange 48 is held against a shoulder, formed on the spindle 50 by the tenon on the upper end thereof, by a nut 52, which threads on the extreme upper end of said spindle 50.

The spindle 50 is journaled in bushings carried by a sleeve 53 secured in a suitable counterboring in the base plate 41. Mounted on an undercut portion of the sleeve 53 is a casting 54 secured against rotation by a key 55. A thrust washer 56, interposed between the flange 48 (Fig. 3) and a top surface of the casting 54, forms a friction-reducing bearing between said flange and said casting. Keyed to a tenon formed on the lower end of the spindle 50 (Figs. 3 and 6) is a Geneva gear 57, which is held against the shoulder formed by said tenon by a nut threaded on the extreme lower end of said spindle 50.

The Geneva gear 57 has therein five equally spaced notches 58 (Fig. 6) adapted to be engaged by a driving roller 59 mounted on the face of a driving disk 60 secured on a shaft 61. Integral with the disk 60 is a locking plate 62, the periphery of which cooperates with arc-shaped recesses 63, equally spaced between the notches 58 in the Geneva gear 57, to lock said Geneva gear, the spindle 50, and the turntable 47 against movement during the different stages of an operating cycle, as will be explained in detail later.

Clutch mechanism

Secured on the lower end of the vertical shaft 61 (Figs. 4, 6, and 17) is a driven member 64 of a clutch, said member having in one face thereof teeth adapted to be engaged by corresponding teeth in a clutch driving member 65 slidably supported on a flanged sleeve 66 free on the shaft 61. Keys cooperating with slots in the clutch driving member 65 and the sleeve 66 permit engaging and disengaging sliding movement of said member, but connect said member 65 to said sleeve 66 for rotary movement in unison therewith. The upper end of the shaft 61 (Fig. 17) is journaled in a bushing in the base plate 41, while the lower end of said shaft is journaled by means of the sleeve 66 in cooperation with a bushing in a Geneva gear housing 68 secured to said base plate 41. A flange 67 of the sleeve 66 (Figs. 6 and 17) is secured in a counterboring in the upper face of a helical gear 69, the teeth of which cooperate with a worm gear 70 secured on a shaft 71 journaled in suitable bushings in the housing 68. The shaft 71 (Fig. 6) is connected by a coupling member 72 to an armature shaft 73 of a motor 74, which motor is preferably secured to the base plate 41, but may, if desirable, be mounted on the foundation which supports the legs 46 (Fig. 1) of the machine.

The clutch driving member 65 (Figs. 1, 4, and 17) has therein an annular groove 75 adapted to be loosely engaged by two identical studs 76 in two similar upward extensions 77 of a clutch disengaging member 78, said member 78 having therein a central boring which fits freely on a reduced portion of the clutch driven member 64. A downward extension of the member has therein a slot adapted to receive the rearward end of a lever 79, said rearward end being pivotally mounted in said slot by a stud 80 carried by said member 78. The lever 79 likewise passes through a slot in a downward extension of a support 84 and is pivoted on a stud 85 carried by said support. The support 84 has a tenon, which is threaded into a boss 86 formed on the housing 68, and said tenon and a spring arm 87, free thereon, are locked in place by a lock nut 88. A spring 89, tensioned between the spring arm 87 and the lever 79, urges said lever in a clockwise direction (Fig. 4) to normally maintain the clutch driving member 65 in engagement with the clutch driven member 64. A foot pedal 90 on the left-hand end of the lever 79 provides means for operating the lever counter-clockwise, against the action of the spring 89, to disengage the clutch driving member 65 from the driven member 64, to disconnect the shaft 61 and mechanism secured thereon, including the Geneva gear driving disk 60 (Figs. 6 and 17) and the Geneva gear locking plate 62, from the driving motor 74, when it is necessary or desirable.

The table 47 (Figs. 2 and 12) has therein five sets of holes 91, each set corresponding to one of the five stages of an operating cycle, and each hole has fast therein a bushing 92 adapted to receive the threaded tenon of a projectile fuse 93.

The motor 74 and the gearing shown in Figs. 6 and 17 cause the Geneva gear 57 (Figs. 2, 3, and 17) to rotate the table 47 in a counter-clockwise direction, as shown in Fig. 2, to carry the different sets of bushings 92, and the fuses 93 inserted therein, progressively from one station or stage of the operating cycle to another, and to retain said fuses in said stations a sufficient length of time for the machine to automatically perform the machining and assembling operations on the fuses. By referring to Fig. 2, it will be seen that the five stations are numbered 1, 2, 3, 4, and 5 progressively in a counter-clockwise direction around the table 47, and will hereinafter be used in identifying the different stages of the operating cycle and in explaining the mechanism associated with each of said stages of operation.

As each of the five sets of bushings 92 (Figs. 2 and 12) is brought to station 1, the holes in said bushings are loaded with four of the projectile fuses 93, as here shown. This loading is effected by an operator, who manually places said fuses in the holes in said bushings, and this constitutes the only manual portion of the operation of the machine, as thereafter the machine functions automatically to perform the machining and assembling operations on the fuses 93, at the completion of which the finished fuses are automatically lifted from the bushings 92 and deposited in a chute which guides said fuses to a suitable receptacle.

Figs. 22, 23, 24, and 25 show the fuses 93 in the different steps or stages of the operating cycle. Fig. 22, for example, shows the condition of the fuses 93 when they are hand-loaded into the holes in the bushings 92 at station 1 (Fig. 2) in the first step or stage of the operation.

Fig. 23 shows the condition of the fuses 93 at the completion of the second stage of the operating cycle, which is performed at station 2 and in which a counterboring 94 is machined in the upper ends of said fuses.

Fig. 24 shows the condition of the fuses 93 at the completion of the third stage of operation, which is performed at station 3 and in which a small metal pellet 95 is automatically inserted in each of the counterborings 94.

Fig. 25 shows the condition of the fuses 93 at the completion of the fourth stage of the operating cycle, which is performed at station 4 and in which the upper edges or rims of the counterborings 94 are crimped over, as shown at 96, to secure the pellets 95 in said counterborings.

In the fifth stage of the operating cycle, which is performed at station 5, the completed fuses 93 are lifted from their nesting holes in the bushings 92 and deposited in a chute which guides them to a suitable receptacle.

The drive of the motor 74 (Figs. 5, 6, and 17) is transmitted to the different mechanisms of the machine through a gear 97 secured on the shaft 61, said gear 97 meshing with an idler gear 98 free on the sleeve 53 (Figs. 3 and 5), which rotatably supports the spindle 50. The idler gear 98 meshes with and drives similar gears 99, 100, and 101 free on rods 102, 103, and 104, the lower ends of which are secured in the base plate 41 (Figs. 1 and 5) and the upper ends of which are supported by the casting 54.

Counterboring mechanism

The gears 99, 100, and 101, together with the shaft 61, transmit the drive of the motor 74 to the different mechanisms of the machine, and the manner in which the gear 99 operates the counterboring mechanism, located at station 2 of the machine, will now be described.

The gear 99 (Figs. 1, 5, and 9) has a drum-shaped upward extension 105 having therein a cam groove 106 engaged by a roller 107 free on a pin secured in a block 108 slidably mounted in a slot 109 in a bracket 110 secured to the upright 42. The block 108 has threaded therein the lower end of a rod 111, the upper end of which is secured in a cross member 112 of a casting 113 having similar borings therein, which slide on similar guide pins 139 and 140, the lower ends of which are secured in a plate 141 (Figs. 9 and 10) in turn secured to the top plate 40 of the machine. The casting 113 is supported for vertical sliding movement by the pins 139 and 140, and the rod 111 passes through guide holes in the top plate 40 and the plate 141.

The casting 113 (Figs. 1, 9, and 11) rotatably supports four identical spindles 114, the upper ends of which spindles are keyed in bushings 115 journaled in borings in a casting 116 secured to the upper ends of the pins 139 and 140. While the spindles 114 rotate in unison with said bushings, still they are free to slide vertically therein, as the casting 113 is lowered and raised to counterbore the fuses 93. Each of the bushings 115 (Figs. 9 and 10) has secured to the upper end thereof a worm gear 117, which meshes with a companion worm gear 118 secured on a shaft 119 journaled in the casting 116. Secured on the right-hand end of the shaft 119 is a pulley 120 connected by a belt 121 to a similar pulley secured on the armature shaft of a motor 122 mounted on a bracket 123 secured to the upright 42.

Each of the spindles 114 (Figs. 9, 11, and 12) has secured on the lower end thereof a drill chuck 124 having clamped therein a counterboring tool 125, which extends through a clearance hole in a bushing 126 secured in a pressure plate 127 slidably supported by a pair of studs 128 and 129 threaded into the casting 113. Compressible springs 130 on each of the studs 128 and 129 urge the corresponding pressure plate 127 downwardly, which downward movement is terminated by heads on said studs 128 and 129. The pressure of the springs 130 (Fig. 9) may be adjusted by means of adjusting and locking nuts threaded on the studs 128 and 129. Each of the bushings 126 (Fig. 12) has clamped in a central boring therein an annular type of ball bearing, the center bushing 133 of which forms a guide for the corresponding counterboring tool 125. The bushing 133 is centrally located in relation to a conical boring 134 in the bushing 126, which boring conforms in shape to the external surface of the fuse 93.

Rotation of the gear 99 (Figs. 5 and 9) and the drum 105 causes the cam groove 106, operating according to the time given in space 1, Fig. 29, and in cooperation with the roller 107, to shift the slide block 108, the rod 111, and the casting 113 downwardly. Downward movement of the casting 113 carries the plates 127 and the bushings 126 in unison therewith until the borings 134 engage the noses of the four fuses 93 awaiting operation at station 2. The borings 134, due to the pressure plates 127 and the springs 130, firmly grip the fuses 93 before the counterboring tools 125 contact said fuses, so that said fuses will be held against rotation while the counterborings are being formed therein. Continued downward movement of the casting 113 compresses the springs 130 and causes the counterboring tools 125 to form the counterborings 94 (Fig. 23) in said fuses 93. After the counterborings have been machined in the fuses 93, continued rotation of the gear 99 causes the cam groove 106 (Fig. 9 and space 1, Fig. 29) to restore the casting 113 and connected parts upwardly to normal position, as here shown.

Adjustable stops have been provided on the casting 113 for accurately determining the depth of the counterborings 94. This adjusting means includes two stop screws 135 (Figs. 1, 9, and 10) threaded in a bar 136 secured to the cross bar 112 of the casting 113, said stop screws 135 adapted to be locked in adjusted position by means of lock nuts 137 after said stop screws have been adjusted in relation to corresponding stop studs 138 secured in the plate 141, thus providing means, independent of the cam groove 106 and associated parts, for accurately determining the depth of the counterborings in the fuses 93.

*Pellet feeding and placing mechanism*

After the counterboring operation has been completed at station 2, the table 47 is indexed by the Geneva gear mechanism shown in Fig. 6 and described above, to transport said fuses to station 3, where the metal pellets 95 are inserted into the counterborings 94. The pellet-inserting mechanism will now be described.

Secured near the upper end of the shaft 61 (Figs. 8 and 17) is a disk 142 having in the periphery thereof diametrically-opposed V-shaped notches 143 adapted to be engaged by V-shaped spring-pushed plungers 144 slidably supported in diametrically-opposed slots in similar blocks 145 secured to the bottom face of a cam 146 free on the shaft 61. The plungers 144, in cooperation with the notches 143, form an impositive or disengageable drive between the shaft 61 and the cam 146, to serve as a safety device in case of accidental jamming of the pellet mechanism.

The cam 146 (Figs. 5, 7, and 17) has therein a cam groove 147, which is engaged by a roller 148 rotatably supported by a stud in a slide 149 free in a rectangular opening formed by plates 150 and 151 secured to the main top plate 40. The slide 149 (Figs. 5, 7, 14, and 17) has secured thereto an upright 152, the upper end of which extends into a recess in a rack 153, and said upright 152 is gripped between adjusting screws 154 and 155 threaded in said rack 153, to provide a means for adjusting said parts in relation to each other.

The rack 153 is slidably mounted in a slot formed by plates 156 and 157 (Figs. 14, 15, and 17), and the bottom of said rack bears on the top surface of a plate 158, to which the two plates 156 and 157 are secured. The plate 158 is in turn secured to the main top plate 40, and the upright 152 passes through clearance openings in the plates 151, 40, and 158 (Fig. 17).

The rack 153 (Figs. 13, 14, 15, and 17) meshes with two similar gears 159 and 160 secured, respectively, on shafts 161 and 162 journaled in uprights 163 and 164 in turn secured respectively to the plates 156 and 157. Secured on each end of the respective shafts 161 and 162 are identical cranks 165 and 166 carrying, respectively, studs 167 and 168, which freely engage corresponding borings in hangers 169 and 170 secured to the bottom surface of a plate 171.

Rotation of the cam 146 in unison with the shaft 61 in a clockwise direction, as observed in Fig. 5, causes the groove 147, operating according to the time given in space 3, Fig. 29, to move the slide 149, the upright 152, and the rack 153 (Figs. 14, 17, and 18) first in a direction away from the center of the machine or toward the right as here observed. Initial movement of the rack 153, through the gears 159 and 160, revolves the shafts 161 and 162 and the cranks 165 and 166 first in a counter-clockwise direction (Figs. 17 and 18), causing said cranks to oscillate the plate 171 also in a counter-clockwise direction to place the pellets 95 in the counterborings 94 in the fuses 93, as will be explained later. Continued movement of the cam 146, through the mechanism just described, causes the plate 171 to be oscillated clockwise back to normal position, as shown here, after the pellets have been deposited in the counterborings.

Secured to the top surface of the plate 171 (Figs. 13, 14, 17, and 18) are four similar racks 172, which mesh with their respective gears 173 for each of the four pellet feeding and inserting mechanisms. Each of the gears 173 is free on a reduced portion of a corresponding pellet guide or magazine tube 174, a tenon on the lower end of which is secured in a boring in the plates 156 or 157. Each of the gears 173 has a clutch cut 175 in the upper end thereof adapted to receive tenons on the lower end of a corresponding agitator tube or sleeve 176 free on the reduced portion of the tube 174 and also free in a boring in a depending portion of a pellet hopper 177 supported by two similar brackets 178 (Fig. 15) secured to the top surface of the table 40.

Each of the sleeves 176 (Fig. 18) has on the upper end thereof an agitator extension 1178, which extends into a funnel-shaped portion of the hopper 177.

Oscillation of the plate 171 in the manner explained above causes the racks 172 in turn to oscillate the gears 173, the sleeves 176, and the agitator extensions 1178 back and forth to agitate the pellets 95 so that they will feed downwardly into a central boring in each of the tubes 174 in an orderly manner and without clogging up the mouths of said tubes. The pellet feed tubes 174 extend through clearance openings 179 (Figs. 13 and 18) in the plate 171. By referring to Fig. 18, it will be noted that the gear 173 is long enough in relation to the rack 172 to permit oscillating movement of said rack and the plate 171.

A plurality of sight apertures 181 (Fig. 18), located near the lower end of each of the tubes 174, permits viewing the central boring of said tubes to determine whether or not the pellets 95 are feeding and stacking up properly therein.

*Pellet feeding slides*

Each of the four pellet feeding and assembling heads 177 has a slide 182 (Fig. 18), which is actuated by the plate 171, for pushing the pellets 95, one at a time, from the central borings in the magazine tubes 174 into alinement with the pellet placing or assembling mechanism, which later picks up said pellets and places them in the counterborings in the upper ends of the fuses 93.

Referring now to Figs. 14, 16, 17, and 19, the plate 171 has secured therein a bushing 183 for each of the pellet assembling heads, each of which bushings is a slip fit on a corresponding stud 184 having a tapered head 185 formed on the lower end thereof, adapted to be engaged by jaws formed in levers 186 and 187 of a pincer-type clamp. The levers 186 and 187 are pivoted on corresponding studs carried by the corresponding slides 182, and the jaws formed by said levers are yieldingly engaged with the heads 185 by torsion springs 188, which urge said levers 186 and 187 in opposite directions. The spring clamps formed by the levers 186 and 187 (Figs. 16 and 19) form a yieldable connection between the studs 184 and the slides 182 to prevent damage to the parts in case the pellets 95 jam in the tubes 174 or in the slots through which they are pushed by said slides 182, and moreover provide a quick and convenient means for removing said slides in case the necessity arises.

Each of the slides 182 (Figs. 14 and 18) is slidably supported in a corresponding slot formed in the plate 158, said slot likewise having secured in the bottom thereof a corresponding support plate 189, upon which the slides 182 rest. The slides 182 are approximately the same thickness as the pellets 95 and slide freely in the grooves in the plate 158 and between the top surface of the corresponding support plate 189 and the lower surface of the plates 156 or 157.

Counter-clockwise rotary movement of the plate 171 (Figs. 13, 14, 16, and 18), as explained above, by means of the bushings 183 in cooperation with the studs 184 and the spring clamps formed by the levers 186 and 187, carries the slides 182 toward the center of the machine or toward the left, as viewed in Fig. 18, in unison therewith. This movement of the slides 182 causes a V-shaped centering notch 190 in the forward ends of said slides to engage the lowermost pellets 95 in the tubes 174 and push said pellets forwardly out of the slots formed by the top surfaces of the supports 189 and the bottom surfaces of the plates 156 or 157, to a predetermined position on the forward ends of said supports 189, as shown in Fig. 14. This locates the pellets 95 in position to be properly engaged by the pellet lifting and placing mechanism, which moves in unison with the plate 171 and which, at the time the pellets are pushed forward by the slides 182, is in its counter-clockwise position, away from the supports 189.

In their initial movements forwardly, the slides 182 (Fig. 18) pass over the lower ends of the tubes 174 and thus close the openings in said tubes. Return movement of the slides 182 away from the center of the machine, or toward the right, as viewed in Fig. 18, leaves the pellets 95 in proper position on the supports 189 to be engaged by the pellet lifting and placing mechanism, and the movement of the notched portions 190 (Fig. 19) of said slides beyond the lower ends of the tubes 174 permits the lowermost pellets to drop down into position to be pushed forward by said slides 182 in their next operation.

When the slide 182 of the one of the four units shown in Fig. 18, which slide will hereinafter be used as representative of all four units, and the plate 171 are returned clockwise to normal position, as shown here, a countersunk boring 192 in a sleeve 193 comes to rest over the pellet 95, which has just been moved forward by the slide 182, as explained above. The sleeve 193 fits freely in borings in a cross bar of a bracket 191, secured to the plate 171, and a boring in said plate 171, said borings being in vertical axial alinement. A compressible spring 194, which fits over a reduced portion of the sleeve 193 and between a shoulder formed by said sleeve and the bottom surface of the plate 171, urges said sleeve 193 downwardly, which downward movement is determined by an adjustable collar 195 secured on the upper end of said sleeve. A screw 196, threaded in the front edge of the plate 171, has a tenon which engages a vertical slot in the sleeve 193 to prevent turning of said sleeve.

The sleeve 193 (Figs. 15, 18, and 24) has a central boring, which freely supports a tube 197 having an enlarged head 198 on the lower end thereof, which fits freely in a counterbored portion of said sleeve 193. A leaf spring 199, which is anchored near its center between a collar and the head of a screw stud 200 threaded in the plate 171, has in opposite ends thereof holes which freely slip over the adjacent pair of tubes 197, said ends being clamped between similar adjustable collars 201 secured to said tubes 197. The spring 199 is tensioned to urge the tube 197 (Fig. 18) downwardly to cause the enlarged head 198 to yieldingly engage the pellet 95 when the parts are in the position shown here.

Flexible tubing 202 (Figs. 15 and 18) connects each of the four tubes 197 to a Venturi tube 203 secured to the hopper casting 177. A tube 204 connects the Venturi tube to a valve 205 (Figs. 10 and 11). A tube 207 (Fig. 11) connects the valve 205 to a supply source of compressed air. The valve 205 is operated by a plunger 208 (Figs. 10 and 11) in cooperation with a camming surface 209 on an extension of the bar 136.

While the sleeve 193 (Fig. 18) is in position over the pellet 95, as shown here, downward movement of the counterboring framework 113 (Figs. 10 and 11) causes the camming surface 209, in cooperation with the plunger 208, to open the valve 205 according to the time given in space 2, Fig. 29, to permit compressed air to flow through the tubes 207 and 204 to the Venturi tube 203 at high velocity. The upward blast of air through the Venturi tube 203 creates a suction or a partial vacuum in the tube 202, causing the pellet 95 to be held firmly against the head 198 of the tube 197 so that said pellet will be picked up and carried counter-clockwise in unison with the sleeve 193 and the plate 171.

Holes in the forward ends of the supports 189 (Fig. 14), which are directly beneath the pellets 95 when said pellets are in their forward positions, eliminate excessive surface tension between the bottom of the pellets and the top surface of the supports 189, to insure that said pellets do not stick to said supports. Counter-clockwise movement of the sleeve 193, in unison with the plate 171 (Fig. 18) and associated mechanism, carries the pellet 95 in unison therewith. Near the end of this counter-clockwise movement, the conical-shaped boring 192 in the lower end of the sleeve 193 yieldingly engages the upper end of the corresponding fuse 93, due to the action of the spring 194, to accurately locate the counterboring 94 in said fuse with the pellet 95, so that said pellet will be properly deposited in said counterboring.

After the pellet 95 has been deposited in the counterboring 94, as shown in Fig. 24, upward movement of the counterboring framework 113 (Fig. 10) causes the cam surface 209, in cooperation with the plunger 208 (space 2, Fig. 29), to close the valve 205 to terminate the blast of air through the Venturi tube 203 (Fig. 15). This termination of the blast of air through the Venturi tube 203 simultaneously terminates the suction in the tube 202 to effect the releasing of the pellet 95, so that said pellet will remain in the counterboring 94.

Return movement clockwise of the sleeve 193 (Fig. 18), in unison with the plate 171, lifts the conical boring 192 clear of the nose of the fuse 93, and, to insure that said pellet does not stick in said boring, the tube 197 and its associated head 198, which have been forced upwardly against the action of their spring 199 when the sleeve 193 engages the upper end of the fuse 93, as shown in Fig. 24, act as an ejector when said sleeve starts its upward movement, to insure that said pellet 95 does not for any reason stick in said conical boring.

*Crimping and stamping mechanism*

After the pellets have been placed in the counterborings, as explained above, the Geneva gear mechanism shown in Fig. 6 functions to index the table 47 (Figs. 1 and 2) to advance the fuses from station 3 to station 4, where the upper ends of said fuses adjacent the counterborings 94 are crimped over, as indicated at 96 (Fig. 25) to secure the pellets 95 in the counterborings 94.

By referring to Fig. 5, it will be recalled that the gear 100 is driven by the idler gear 88, which, through the gear 97, the shaft 61, and the worm gearing shown in Figs. 6 and 17, is driven by the motor 74.

The gear 100 (Figs. 1, 5, and 20) has integral therewith a drum-shaped portion 212 having therein a camming slot 213 engaged by a roller 214 rotatably supported on the end of a pin 215 secured in a slide block 216. The slide block 216 is mounted for vertical sliding movement in a slot in an enlarged portion of the upright 44. The block 216 has threaded therein the lower end of a connecting rod 217 with an enlarged head on the upper end thereof, which carries a pin 218 freely engaged by the lower ends of two identical links 219, which straddle the head portion of said rod 217. The links 219 likewise straddle a beam 220, and the upper ends thereof are pivoted on a pin 221 secured in said beam. The rearward or right-hand end of the beam 220 (Fig. 20) is pivotally connected by a link 222 to a bracket formed by two angle bars 223, the forward ends of which are secured to a plate 224 in turn secured to the main top plate 40. The rearward or right-hand ends of said bars 223 are further supported by a bar 225 extending between said bars and the upright 44.

The forward end of the beam 220 (Figs. 1, 20, and 21) has formed thereon an enlarged boss 226, which supports a pin 227 engaged by two similar upward extensions 228 of a connecting bracket 229. A base portion of the bracket 229 is secured to the flat top surface of a main casting 230, which casting supports the four identical crimping heads for simultaneously crimping over the upper ends of the four fuses 93, in each of the five sets of fuses, as they arrive at station 4. The casting 230 (Figs. 20 and 21) has two upright cylindrical portions having therein similar borings, which are a slip fit on guide pins 231 and 232 having tenons on the lower ends thereof secured in the plate 224.

The mechanism shown in Fig. 6 revolves the gear 100 and the cam drum 212 one revolution in a clockwise direction each time the turntable 47 is dwelling in one of its five positions. Rotation of the cam 212, by means of the cam slot 213 in cooperation with the roller 214, shifts the slide 216 first downwardly to crimp over the upper ends of the fuses 93, as will be explained more fully later, and then back to normal position, as shown in Fig. 20, according to the time given in space 4, Fig. 29. Downward movement of the casting 230 (Fig. 20) and the crimping mechanism supported thereby, in addition to crimping the upper ends of the fuses 93, likewise causes a stamping mechanism, supported by each of the four crimping heads, to stamp identifying data on the outside circumference of the fuses 93.

A forward extension 233 (Fig. 20) of the upright 44 fits snugly between the casting 54 and the turntable 47 and assists said casting in supporting the upper end of the spindle 103, and likewise supports the table 47 against the downward thrust of the crimping and stamping mechanisms. A thrust block 234, secured to a bottom surface of the extension 233, in cooperation with a tempered thrust ring 235 inserted in a recess in the top face of the drum 212, assists the casting 54 in absorbing the thrust load imposed on said drum 212 when the crimping and stamping mechanisms function.

The casting 230 (Figs. 1, 20, and 26) supports the four crimping and stamping heads, all of which are exactly alike. A cross section of one crimping and stamping head is shown in Fig. 26 and will be used as representative of all four heads in the following description.

The crimping and stamping mechanism shown in Fig. 26 comprises an internal sleeve 236 having a conical boring 237, which fits the contour of the fuse 93 to centrally locate the upper end of said fuse in relation to a ring staking or crimping groove 238 in a rod 239, which rod is a slip fit in a central boring in the sleeve 236. The internal sleeve 236 is a slip fit in a central boring in an external sleeve 240 free in a boring in the casting 230. The sleeve 240 is adjustable vertically in said boring by means of a threaded bushing 241 free on the external circumference thereof, and having threaded thereon an adjusting ring nut 242 adapted to engage the bottom surface of the casting 230 to adjust the sleeve 240 up or down in relation to the turntable 47 and the fuse 93. A clearance boring in the casting 230 provides clearance for the vertical adjustment of the bushing 241.

The upper end of the sleeve 240 is threaded to receive a threaded cap 243 adapted to engage the top surface of the casting 230 to clamp the nut 242 against the bottom surface of said casting to secure the sleeve 240 and associated parts in set positions. The bushing 241 (Fig. 26), the ring nut 242, and the cap 243 have in the peripheries thereof a plurality of spanner wrench holes to facilitate the adjustment and the tightening thereof. A screw stud 244 (Fig. 26), threaded in the casting 230, has thereon a tenon adapted to cooperate with vertical slots in the sleeves 240 and 236 to prevent the turning of said sleeves.

The rod 239 (Fig. 26) has secured thereto a collar 245 free in the central boring of the sleeve 240. A spring 246 fits freely in the boring in the sleeve 240 and around the rod 239, and said spring is compressed between the collar 245 and a counterboring in the cap 243 to urge said rod 239 downwardly. The upper end of the rod 239 cooperates with the lower end of an adjusting screw 247 threaded in the cap 243 and adapted to be locked in adjusted position by a ring nut 248, threaded thereon, when said nut is tightened against the top face of said cap 243. A plurality of spanner wrench holes are provided in the periphery of the ring nut 248 and the periphery of the head of the screw 247 to facilitate the turning and tightening of said parts.

The vertical slot in the sleeve 236 (Fig. 26), in cooperation with the tenon of the screw 244, determines the extent of the downward movement or position of rest of said sleeve and the crimping rod 239, under influence of the spring 246. A boring in the center of the screw 247 freely supports a knockout pin 249, which is provided for manually driving down the rod 239 to eject the fuse 93 if for any reason said fuse sticks so tightly in the boring 237 that the spring 246 is not strong enough to eject it therefrom.

Downward movement of the head 230 (Figs. 20 and 26), under influence of the cam groove 213 and according to the time given in space 4 of the time chart (Fig. 29), causes the boring 237 in the sleeve 236 to engage the nose of the fuse 93 to centrally locate said fuse in relation to the crimping groove 238 in the rod 239. Immediately thereafter, the upper end of the rod 239 is contacted by the end of the screw 247, which forces said rod downwardly, causing the groove 238 to engage and crimp over the upper end of the fuse 93, as shown at 96 (Fig. 25) to secure the pellet 95 in the counterboring 94. Upon return movement upwardly of the casting 230, the spring 246, in cooperation with the collar 245 and the rod 239, acts as an ejector to eject the crimped fuse 93 from the boring 237.

*Stamping mechanism*

Simultaneously with the crimping of the upper end of the fuse 93 (Fig. 26), mechanism, operated by downward movement of the casting 230, causes identifying data to be stamped or impressed on the periphery of said fuse near the bottom edge thereof, as indicated at 250 (Fig. 25).

A conical head portion 252 (Figs. 26 and 27) of the sleeve 236 has therein a plurality of angular slots, each of which slidably supports and L-shaped stamping member 253, and said head 252 likewise contains three wider slots which slidably support three L-shaped equalizing bars 254, said bars being disposed opposite the stamping members 253 and working in conjunction therewith to equalize and distribute the pressure on the fuse 93 during the stamping operation. The members 253 and the bars 254 are retained in the angular slots by a cover plate or disk 255 secured to the head 252 by a plurality of screws. Compressible springs 256 (Fig. 26), retained freely in angular holes in the conical head 252, engage upward legs 257 and 258 of the respective members 253 and 254 to urge said upward extensions into contact with a tapered boring 259 in a head portion 260 of the external sleeve 240.

Downward movement of the casting 230 and of the sleeve 240 causes the tapered boring 259, in cooperation with the upward legs 257 and 258, to force the members 253 and the bars 254 inwardly against the action of the springs 256 to cause said members 253 to impress or stamp the desired identifying data in the periphery of the fuse 93 and to cause said bars 254 to simultaneously engage the periphery of said fuse, opposite the stamping members 253, to equalize and distribute the stamping load.

When the boring 237 in the sleeve 236 (Fig. 26) properly engages the periphery of the fuse 93 to locate said fuse in relation to the crimping groove 238, a horizontal surface on the downward face of the cap 255 engages the top surface of the turntable 47 to sustain the downward thrust imparted to said sleeve 236 by the stamping members 253 and the equalizing bars 254. The turntable 47 is assisted in sustaining the thrust load imposed by the sleeves 236 and 240 by the extension 233 of the upright 44 (Fig. 20), the supporting frame 54, and the block 234, in cooperation with the washer 235 in the recess in the drum 212. These parts likewise sustain the upward thrust of the drum 212 during the crimping and stamping operations.

Return movement upwardly of the casting 230 (Fig. 26 and space 4, Fig. 29) retracts the tapered boring 259 from the upward legs 257 and 258 to permit the springs 256 to return the impression members 253 and the equalizing bars 254 outwardly out of engagement with the periphery of the fuse 93. Continued return movement upwardly of the casting 230 causes the tenon of the screw 244 to engage the upper end of the slot in the sleeve 236, to carry said sleeve upwardly in unison therewith. The space provided between the upper end of the sleeve 236 and the collar 245 permits said collar and the rod 239 to remain stationary, under influence of the spring 246, during this period to eject the fuse 93 from the tapered boring 237 in the sleeve 236.

Ejecting mechanism

After the crimping and stamping operation has been completed, the Geneva gear mechanism shown in Figs. 6 and 17 indexes the turntable 47 (Fig. 2) to transport the crimped fuses 93 from station 4 to station 5, where, in the next cycle of operation, said fuses are lifted out of the borings in the bushings 92 and deposited in a chute which transports said fuses to a suitable receptacle.

Referring now to Figs. 1, 5, and 28, the gear 101 has integral therewith a drum portion 261 having formed therein a camming groove 262 engaged by a roller 263 rotatably mounted on a pin secured in a slide 264 mounted for vertical sliding movement in a slot in a casting 265 secured to the upright 45. The slide 264 has secured to the upper end thereof a cross bar 266 having secured in opposite ends thereof two identical rack bars 267 and 268. The rack bars 267 and 268 (Figs. 1, 2, 5, and 28) extend vertically through clearance holes in the top plate 40 and are slidably supported, respectively, in vertical slots formed in uprights 269 and 270 secured to the top plate 40. The rack bars 267 and 268 are retained in their respective slots by cover plates 271 and 272 secured, respectively, to the uprights 269 and 270, which cover plates give access to said rack bars and to their associated gears.

The teeth in the rack bar 267 (Figs. 2 and 28) mesh with the teeth in similar companion gears 273 and 274, said gear 273 being secured on a short shaft 275 journaled in the upright 270, and said gear 274 being secured on one end of a shaft 276 extending between the uprights 269 and 270 and having opposite ends journaled therein. The rack bar 268 meshes with companion gears, similar to the gears 273 and 274, secured respectively to a short shaft 277 (Fig. 2) in axial alinement with the shaft 275 and journaled in the upright 269, and said gear corresponding to the gear 274, being secured on the opposite end of the shaft 276. The gears 273 and 274 and their companion gears revolve respectively in clearance recesses formed in the uprights 269 and 270, which recesses are covered by the plates 271 and 272.

Secured, respectively, on the short shafts 275 and 277 (Figs. 2 and 28), and between the uprights 269 and 270, are companion arms 278 and 279. Also, secured near opposite ends of the shaft 276 and between the uprights 269 and 270, are companion arms 280 and 281. Companion links 282 and 283 (Figs. 2 and 28) connect the outer ends of the pairs of arms 278 and 279, and 280 and 281, for unitary parallel movement. The upper ends of the links 282 and 283 are pivoted on a rod 284 supported by the outer ends of the companion arms 278 and 279, and the lower ends of said links have secured therebetween a square bar 285 having on each end thereof tenons which bear in borings in the outer ends of the companion arms 280 and 281.

The bar 285 (Fig. 28) carries four bushings 288 spaced at regular intervals therealong to match the spacing of the four fuses 93 in each set, said bushings having threaded tenons which extend through borings in said bar 285. Nuts 289, in cooperation with the upper ends of the threaded tenons, secure the bushings 288 in place on said bar 285. The bushings 288 have therein tapered borings 290, which conform to the shape of the noses of the fuses 93. Each of the bushings 288 has three equally spaced slots in the periphery thereof, each of which slots supports a fuse-ejecting hook 291 pivoted on a pin 292 in said bushing. Each of the bushings 288 has a compressible spring 293, which loosely encircles an undercut portion thereof, said spring being compressed between a shoulder formed by said undercut portion and shoulders formed on the hooks 291. The springs 293 urge the hooks 291 toward the center of the bushing 288 to normally maintain the fuse-engaging notches in the inside edges of extensions 294 of said hooks in engagement with a shoulder formed by a threaded tenon on the fuses 93 for the purpose of ejecting said fuses from the holes in the bushings 92.

Each of the bushings 92 (Figs. 2, 12, and 28) has in the upper edges thereof three equally spaced notches 295 to provide clearance for the extensions 294 of the hooks 291 when said hooks engage the shoulders of the fuses 93, as shown in Fig. 28. Dowel pins 297 (Fig. 2), which extend through matching holes in the bar 285 and the heads of the bushings 288, prevent the turning of said bushings and thereby maintain the extensions 294 of the hooks 291 in alinement with the notches 295. Each of the bushings 288 (Fig. 28) has a spring-pushed ejector plunger 298, which fits freely in a central boring in said bushing, each plunger having a head 299 which is urged into contact with the pellet 95, secured in the nose of the fuse 93, by a compressible spring tensioned between said head and a shoulder formed by a counterboring in said bushing 288, which counterboring likewise provides clearance for the head 299. Secured on the upper ends of each of the plungers 298 is a collar 300, which, in cooperation with the upper ends of the threaded tenons on the bushings 288, determines the extent of the downward movement of said plungers 298.

The timing of the camming groove 262 (Fig. 1) in the drum 261 is given in space 5 of the time chart (Fig. 29), from which it will be seen that, at the beginning of each of the five stages of an operating cycle, the fuse-ejecting mechanism is in the positions shown in Figs. 1 and 2, after having just completed the ejection of four of the time fuses 93. This position of the ejecting mechanism is also indicated by the dot-and-dash showing of one of the bushings 288 and one of the hooks 291 in Fig. 28.

Initial movement of the gear 101 and the drum 261 (Figs. 1, 2, 5, and 28) causes the cam groove 262, in cooperation with the roller 263, to shift the racks 267 and 268 upwardly to rotate the gears 273 and 274, the shafts 275, 277, and 276, and the corresponding arms 278, 279, 280, and 281 clockwise, as viewed in Fig. 1, through an arc of approximately 180 degrees. The parallel movement of the two pairs of arms 278 and 279 and 280 and 281 causes the links 282 and 283, the bar 285, and the bushings 288 to be maintained in vertical position, as shown here, throughout the entire movement of the ejecting mechanism in either direction.

During initial movement clockwise of the ejecting mechanism, the turntable 47 is indexed by the Geneva gear mechanism, shown in Figs. 6 and 16, to bring the next set of finished fuses 93 to station 5, preparatory to ejecting said fuses. Near the end of initial movement clockwise of the ejecting mechanism (Fig. 28), the conical borings 290 in the bushings 288 engage the noses of the fuses 93, and the notches in the hooks 291 snap over the shoulders of said fuses under the action of the springs 293, in preparation for the ejecting movement counter-clockwise of said ejecting mechanism.

After the finished fuses 93 have been properly engaged by the hooks 291, continued rotation of the cam groove 262 (Fig. 1 and space 5 of the time chart, Fig. 29) returns the ejecting mechanism, including the bar 285 (Fig. 28) and the bushings 288, counter-clockwise, causing said bushings, in cooperation with said hooks 291, to lift the fuses 93 out of the borings in the bushings 92 and to transport said fuses, in ferris-wheel fashion, into alignment with the borings in four bushings 301 secured in the top plate 40. As the completed fuses 93 enter the borings in the bushings 301, angular surfaces on downwardly extending fingers 302 of the hooks 291 engage a tapered surface 303 formed on the upper ends of the bushings 301 and are rocked by said surfaces away from the center of the bushings 288 against the action of the springs 293, to disengage the notches in the hooks 291 from the shoulders of the fuses 93. After the hooks 291 have thus been disengaged, the spring plungers 298, which are under tension at this time, eject the fuses 93 downwardly out of the conical borings 290 in the bushings 288, thereby causing said fuses to drop through the borings in the bushings 301 and into a chute 304 secured to the bottom surface of the top plate 40, which chute directs said finished fuses to a suitable receptacle. The extent of the inward movement of the hooks 291 (Fig. 28), under influence of the springs 293, is determined by the bottom of the corresponding slots in the bushings 288, in cooperation with the flat surfaces on the inner edges of said hooks, to retain said hooks in proper position to snap over the shoulders of the fuses 93 near the end of the initial movement of the ejecting mechanism, as explained above.

From the foregoing description, it is obvious that the present invention is directed to a machine having a turntable with bushings therein adapted to support five sets of projectile fuses, each set consisting of four fuses, said table adapted to be indexed automatically to progressively and intermittently transport the five sets of fuses through the various stages of an operating cycle in which certain machining and assembling operations are performed on said fuses.

In the present embodiment of the machine, the turntable is indexed through five stations for the complete processing of the fuses. At the first station, the fuses are hand-loaded into the recesses provided therefor in the turntable. At the second station, a counterboring is machined in the upper ends of the fuses. At the third station, metal disks or pellets are placed in the counterborings. At the fourth station, the rims formed by the counterborings are crimped over to secure the pellets in said counterborings. At the fifth or final station, the finished fuses are lifted from the recesses in the turntable and deposited in a chute which transports said fuses to a suitable receptacle.

It is believed that further description of the operation of the machine is unnecessary, as a full understanding thereof will have been obtained from a perusal of the preceding specification.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described for assembling elements into articles of manufacture, the combination of a magazine for storing the elements; a table; a guide on said magazine constructed to guide the elements to a predetermined location on said table; a reciprocating means to slide the element on the table from said location into a second location on said table; a pick-up device to pick up said element from said second location; means to move the pick-up device in a continuous semi-circular movement, after the pick-up device has picked up the element, to move said element to a third location in the machine, said third location being in the same horizontal plane as the second location, said pick-up device thereafter movable back to said second location to pick up another element; and a common operating means to operate said feed means and said pick-up device.

2. In a machine of the class described for assembling elements into articles of manufacture, the combination of a magazine containing a plurality of elements; a stationary table located beneath the magazine; a guide to guide said elements out of the magazine into a certain location on said table; a reciprocating feed means to move the element from said location to a second location on said table; a pick-up device adapted to be positioned over the element after the element has been moved into said second position; a compressed air source connected to the pick-up device by means of which the element is picked up from said second-named position; operating means to lift and move the pick-up device in a single continuous semi-circuar movement to deposit the element into an article of manufacture, said article of manufacture located so as to present the receiving portion thereof in the same plane as the first and second positions of the table; and means to interrupt the air source to release the element from the pick-up device, whereby the element is left in said article of manufacture.

3. In a machine of the class described, the combination of a magazine containing a plurality of elements to be assembled into articles of manufacture; means to feed the elements out of the magazine one at a time; an agitator in the magazine to cause the elements to be properly located in relation to the feed means; means comprising a rotatable gear carried by the agitator and a rack meshing with the gear, whereby the agitator is oscillated; pick-up means to pick up the element fed from the magazine and to deposit it into the article of manufacture; a common support for the pick-up device and said rack; and power means to move the common support in a semi-circular movement through 180 degrees to cause the pick-up means to pick up the element from a certain level and deposit the element in the article of manufacture at a fixed distance on the same level from which it is picked up, said common means simultaneously, through said rack, rotating the agitator.

4. In a machine of the class described, the combination of a magazine containing a plurality of elements to be assembled into articles of manufacture; means to feed the elements out of the magazine one at a time; an agitator in the magazine to cause the elements to be properly located in relation to the feed means; means comprising a rotatable gear carried by the agitator and a rack meshing with the gear, whereby the agitator is oscillated; pick-up means to pick up the element fed from the magazine and to deposit it into the article of manufacture; a common support for the pick-up device and said rack; a pair of pivoted arms, the free ends of which extend in a horizontal direction from their pivot points; studs on the free ends of the arms projecting into slots in said common support; and power means to move the arms through a 180-degree movement, to thereby move the common support a like degree of movement to thereby move the pick-up means an extent sufficing to pick up the element from a certain level and deposit the element on the article of manufacture at a certain distance on said same level and, through said rack, rotate the agitator means.

5. In a machine of the class described, the combination of a magazine containing a plurality of elements to be assembled into articles of manufacture; means to feed the elements out of the magazine one at a time; an agitator in the magazine to cause the elements to be properly located in relation to the feed means; means comprising a rotatable gear carried by the agitator and a rack meshing with the gear, whereby the agitator is oscillated; pick-up means to pick up the element fed from the magazine and to deposit it into the article of manufacture; a common support for the pick-up device and said rack; means to connect the feed means to the common support whereby the feed means is operated upon movement of the common support; and power means to move the common support in a semi-circular movement through 180 degrees to cause the pick-up means to pick up the element from a certain level and deposit the element in the article of manufacture at a fixed distance on the same level from which it is picked up, said common means simultaneously, through said rack, rotating the agitator.

6. In a machine of the class described, the combination of a magazine containing a plurality of elements to be assembled into articles of manufacture; means to feed the elements out of the magazine one at a time; an agitator in the magazine to cause the elements to be properly located in relation to the feed means; means comprising a rotatable gear carried by the agitator and a rack meshing with the gear, whereby the agitator is oscillated; pick-up means to pick up the element fed from the magazine and to deposit it into the article of manufacture; a common support for the pick-up device and said rack; a slip connection between the feed means and the common support whereby the feed means may be operated to travel in a straight line as the common support travels in a semi-circle; and power means to move the common support in a semi-circular movement through 180 degrees to cause the pick-up means to pick up the element from a certain level and deposit the element in the article of manufacture at a fixed distance on the same level from which it is picked up, said common means simultaneously, through said rack, rotating the agitator.

JOSEPH C. WIDMONT.